United States Patent
Saur et al.

(10) Patent No.: US 10,315,690 B2
(45) Date of Patent: Jun. 11, 2019

(54) COMPENSATING FOR THE DELAY DURING A MEASUREMENT OF THE ANGULAR POSITION OF A ROTOR

(71) Applicant: Robert Bosch Automotive Steering GmbH, Schwäbisch Gmünd (DE)

(72) Inventors: Stefan Saur, Schorndorf (DE); Malte Elzmann, Burgstetten (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/761,315

(22) PCT Filed: Sep. 5, 2016

(86) PCT No.: PCT/EP2016/070854
§ 371 (c)(1),
(2) Date: Mar. 19, 2018

(87) PCT Pub. No.: WO2017/050550
PCT Pub. Date: Mar. 30, 2017

(65) Prior Publication Data
US 2018/0265122 A1    Sep. 20, 2018

(30) Foreign Application Priority Data
Sep. 21, 2015   (DE) .......................... 10 2015 115 860

(51) Int. Cl.
*G05B 6/02*   (2006.01)
*H02P 6/16*   (2016.01)
(Continued)

(52) U.S. Cl.
CPC .......... *B62D 5/0481* (2013.01); *B62D 5/046* (2013.01); *G05B 6/02* (2013.01); *H02P 6/16* (2013.01); *H02P 23/0022* (2013.01)

(58) Field of Classification Search
CPC ...... H02P 1/00; H02P 3/00; H02P 3/18; H02P 1/24; H02P 1/46; H02P 6/00; H02P 6/14;
(Continued)

(56) References Cited

U.S. PATENT DOCUMENTS

| | | | |
|---|---|---|---|
| 8,129,935 B2 * | 3/2012 | Kariatsumari | H02P 21/0003 318/432 |
| 8,924,080 B2 * | 12/2014 | Oniwa | G05D 17/02 701/41 |

(Continued)

FOREIGN PATENT DOCUMENTS

| | | |
|---|---|---|
| DE | 60 2004 002 739 T2 | 8/2007 |
| EP | 2 066 018 A2 | 6/2009 |

(Continued)

OTHER PUBLICATIONS

International Search Report corresponding to PCT Application No. PCT/EP2016/070854, dated Nov. 29, 2016 (German and English language document) (7 pages).

(Continued)

*Primary Examiner* — Antony M Paul
(74) *Attorney, Agent, or Firm* — Maginot, Moore & Beck LLP

(57) ABSTRACT

A method for compensating for a delay in a feedback branch of a servo drive, wherein the servo drive is provided for power-steering a vehicle, includes determining the delay. The method further includes arithmetically compensating for the delay by measuring the spatial expansions of a corresponding metal conductor of the servo drive and the feedback branch. The delay takes place due to formation of eddy currents.

7 Claims, 3 Drawing Sheets

(51) Int. Cl.
*H02P 23/00* (2016.01)
*B62D 5/04* (2006.01)

(58) Field of Classification Search
CPC .......... H02P 23/00; H02P 27/00; G05B 11/01;
G05B 11/32; G05D 23/00; G05D 23/275
USPC ......... 318/34, 37, 47, 62, 98, 560, 625, 628,
318/632, 400.01, 400.1, 400.23, 650, 285,
318/484, 486, 783, 800, 801, 400.14, 432,
318/700, 701, 727, 779, 799; 361/23, 30
See application file for complete search history.

(56) References Cited

U.S. PATENT DOCUMENTS

| | | | |
|---|---|---|---|
| 9,160,260 B1 * | 10/2015 | Keas | .................. H02P 29/50 |
| 2014/0195122 A1 | 7/2014 | Oniwa et al. | |

FOREIGN PATENT DOCUMENTS

| | | |
|---|---|---|
| JP | 8239426 B2 | 12/2001 |
| WO | 2015/012576 A1 | 1/2015 |

OTHER PUBLICATIONS

Marouf A et al.,"Control of an Electric Power Assisted Steering System using reference model", Conference on Decision and Control and European Control Conference (CDC-ECC), 2011 50th IEEE Conference, IEEE, Dec. 12, 2011 (Dec. 12, 2011), pp. 6684-6690, XP032122989, DOI: 10.1109/CDC.2011.6161144; ISBN: 978-1-61284-800-6.

* cited by examiner

COMPENSATING FOR THE DELAY DURING A MEASUREMENT OF THE ANGULAR POSITION OF A ROTOR

This application is a 35 U.S.C. § 371 National Stage Application of PCT/EP2016/070854, filed on Sep. 5, 2016, which claims the benefit of priority to Serial No. DE 10 2015 115 860.4, filed on Sep. 21, 2015 in Germany, the disclosures of which are incorporated herein by reference in their entirety.

The disclosure relates to a method for compensating for a delay in a feedback branch of a servo drive, wherein the servo drive can be provided for power-steering a vehicle, and to a steering system for a vehicle.

BACKGROUND

Electric motors which are used as servo motors for power-steering are known in the prior art. The electric motors are controlled, in particular, by inverters which can be designed, for example, as 3-phase half-bridges. These inverters are referred to as ECUs (ECU=electronic circuit unit).

SUMMARY

Feedback signals from the electric motor to be controlled are required in order to control the ECU. The rotor position signal, in particular, is relevant in this case. Before the rotor position signal reaches the controller, it is conditioned by a hardware filter which can be designed as an LC filter (L=inductance and C=capacitance). A delay can result in this case. The measured values of the phase currents can likewise be processed by an electronic filter. These filters can also bring about a delay. In addition, delays can result due to the formation of eddy currents at metal components. The eddy currents can be temperature-dependent. A different delay typically results in each case. These delays can adversely affect the closed-loop control of the phase currents of the electric motor.

One object is therefore that of avoiding or at least reducing an effect of delays due to electronic conditioning of electrical feedback signals.

As the first embodiment of the disclosure, a method is provided for compensating for a delay in a feedback branch of a servo drive, wherein the servo drive is provided for power-steering a vehicle, including the steps of: determining the delay and arithmetically compensating for the delay.

As the second embodiment of the disclosure, a steering system for a vehicle is provided, including a feedback branch for a servo motor, wherein the steering system is suitable for applying a method as claimed in one of claims 1 to 6.

Exemplary embodiments are described in the dependent claims.

According to one exemplary embodiment of the disclosure, a method is provided, wherein the determination and/or the arithmetic compensation of the delay takes place on the basis of an arithmetic model.

Due to the use of an arithmetic model, a highly accurate and situation-specific compensation can take place.

In yet another embodiment according to the disclosure, a method is provided, wherein the delay results due to a filter, in particular an electronic filter for signal conditioning, and/or due to the formation of eddy currents and/or a temperature effect.

By taking the cause of the delay into consideration, possibilities result for cause-specific and, therefore, exact compensation.

In yet another embodiment according to the disclosure, a method is provided, wherein the determination and/or the arithmetic compensation of the delay takes place on the basis of a reference servo drive.

The use of a reference servo drive in a reference working environment provides for a simple application of the compensation model.

According to yet another exemplary embodiment of the disclosure, a method is provided, wherein the determination and/or the arithmetic compensation of the delay takes place on the basis of a measurement of one part of the servo drive and/or one part of the feedback branch.

By way of a part-specific measurement, a highly accurate compensation can result.

According to one exemplary embodiment of the disclosure, a method is provided, wherein the delay due to the formation of eddy currents takes place by measuring the spatial expansions of the corresponding metal conductor of the servo drive and/or of the feedback branch.

One idea of the disclosure can be considered that of carrying out a compensation for delays caused by electronic conditioning of electrical signals by means of an arithmetic compensation. A delay can also result due to the formation of eddy currents at metal components. In this case, suitable software can take the delays into consideration and, therefore, compensate for their disadvantageous effect. An electronic conditioning can take place, for example, by way of a filtering of a feedback signal. The filter can be designed as a hardware filter, for example as an LC filter.

The individual features can also be combined with one another, of course, whereby advantageous effects can also result, in part, which go beyond the sum of the individual effects.

BRIEF DESCRIPTION OF THE DRAWINGS

Further details and advantages of the disclosure become clear on the basis of the exemplary embodiments represented in the drawings. In the drawings

DETAILED DESCRIPTION

Figure 1:
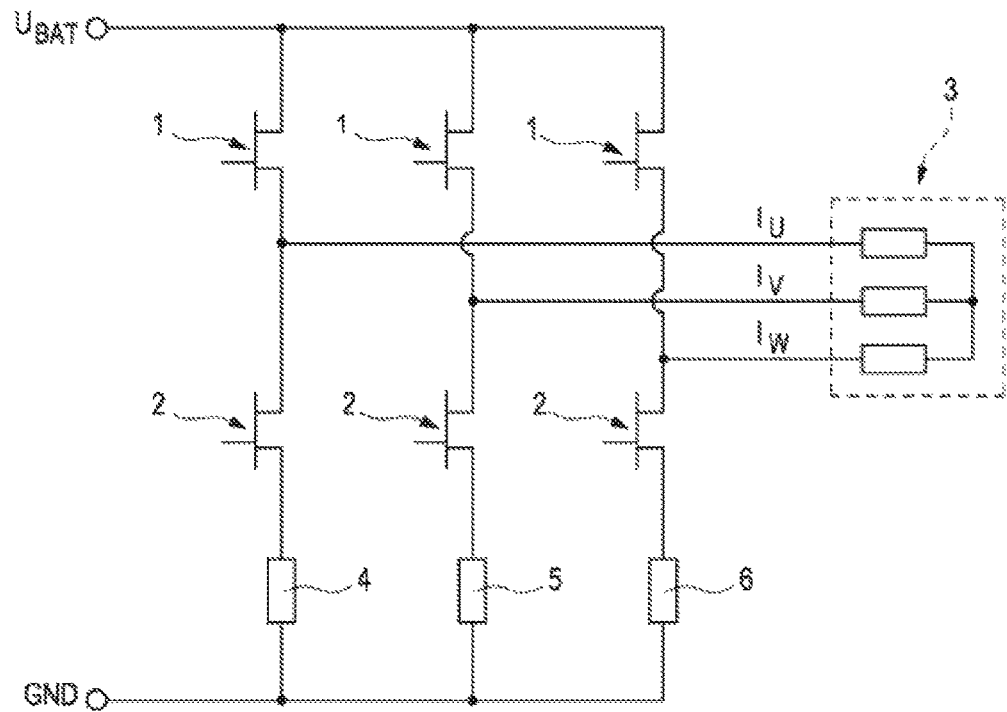
FIG. 1 shows an ECU comprising an electric motor.

FIG. 1 shows an ECU which is designed as a 3-phase half-bridge. The ECU comprises upper power switches 1 and lower power switches 2 which are used for controlling the phase currents $I_U$, $I_V$, $I_W$ of the electric motor 3. In order to control the power switches 1, 2, control signals are calculated, which result from feedback signals from the electric motor 3. Delays in the feedback signals can result due to electronic filters and/or the formation of eddy currents, for example. According to the disclosure, these delays are compensated for, in particular by way of an arithmetic consideration carried out by suitable software. The compensation can be optimized, in particular, by measuring a reference part. By way of such a reference measurement, a high quality of the determination of the delay can result. A single part-specific determination of the delay can be carried out in order to further optimize the determination of the delay. In this case, the spatial expansions of the relevant part can be determined, for example, in order to be able to ascertain the corresponding eddy currents. The ascertained values can be noted on the single part, for example by means of a DMC code. A highly accurate determination of the delays, which is tailored to each single part, can be obtained as a result. The dependency of the eddy currents on the temperature can be depicted with the aid of a temperature model. Alternatively or additionally, the temperature of the parts of the feedback branch that are relevant in this case can be determined by means of suitably situated temperature sensors. An optimal, single part-specific delay compensation can be obtained as a result. The resistors 4, 5, 6 can be utilized as shunt resistors for measuring the corresponding phase current $I_U$, $I_V$, $I_W$.

Figure 2:
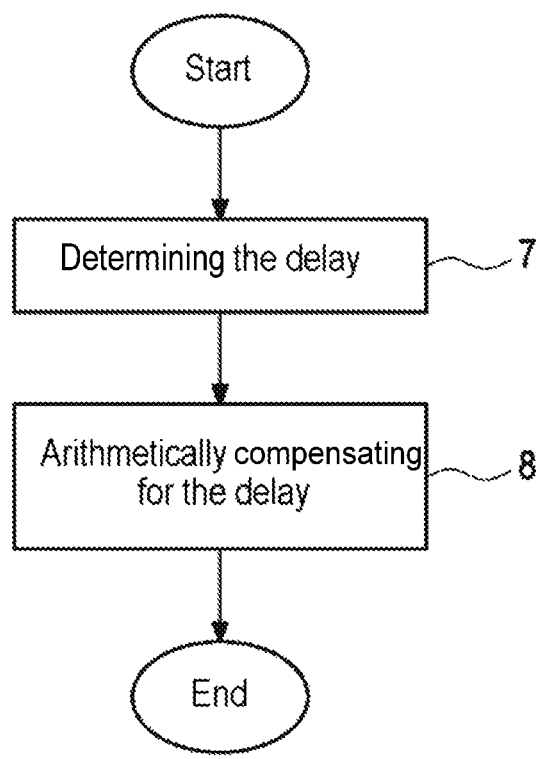
FIG. 2 shows a flow chart of a method according to the disclosure.

FIG. 2 shows a flow chart for representing the method according to the disclosure, which comprises a step including the determination of the delay 7. An arithmetic model and/or a reference servo drive can be used for this purpose, wherein features of the particular single part or of the corresponding servo drive or the technical surroundings of the servo drive can be additionally or exclusively taken into consideration. On the basis of the determined delay, a compensation 8 can take place.

Figure 3:
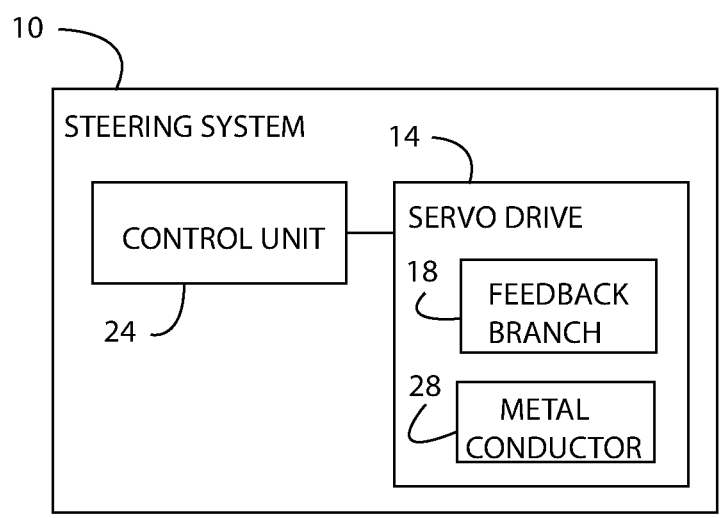
FIG. 3 shows a steering system for a vehicle according to the disclosure.

FIG. 3 shows a steering system 10 for a vehicle including a servo drive 14, a feedback branch 18 for the servo drive 14, and an electronic control unit 24. The electronic control unit 24 is configured to perform the method of FIG. 2 for compensating for a delay in the feedback branch 18 of the at least one servo drive 14. The method includes determining the delay, and arithmetically compensating for the delay by measuring spatial expansions of a corresponding metal conductor 28 of at least one of the servo drive 14 and the feedback branch 18. In one embodiment, the delay takes place due to formation of eddy currents, and the servo drive 14 is provided for power-steering the vehicle.

It is noted that the term "comprise" does not rule out further elements or method steps, and the terms "a" and "an" do not rule out multiple elements and steps.

The reference numbers used are intended solely to increase the comprehensibility and should in no way be considered limiting, wherein the scope of protection of the disclosure is reflected by the claims.

LIST OF REFERENCE NUMBERS

1 upper power switch
2 lower power switch
3 electric motor
4 shunt resistor
5 shunt resistor
6 shunt resistor
7 determining the delay
8 arithmetically compensating for the delay
$I_U$ phase current
$I_V$ phase current
$I_W$ phase current
U phase
V phase
W phase

The invention claimed is:

1. A method for compensating for a delay in a feedback branch of a servo drive, the method comprising:
   determining the delay; and
   arithmetically compensating for the delay by measuring spatial expansions of a corresponding metal conductor of the servo drive and the feedback branch,
   wherein the delay takes place due to formation of eddy currents, and
   wherein the servo drive is provided for power-steering a vehicle.

2. The method as claimed in claim 1, wherein at least one of the determination and the arithmetic compensation of the delay takes place based on an arithmetic model.

3. The method as claimed in claim 1, wherein the delay results due to at least one of a filter, the formation of eddy currents, and a temperature effect.

4. The method as claimed in claim 3, wherein the filter is an electronic filter for signal conditioning.

5. The method as claimed in claim 1, wherein at least one of the determination and the arithmetic compensation of the delay takes place based on a reference servo drive.

6. The method as claimed in claim 1, wherein at least one of the determination and the arithmetic compensation of the delay takes place based on a measurement of one part of the servo drive and one part of the feedback branch.

7. A steering system for a vehicle comprising:
   at least one servo drive;
   a feedback branch for the at least one servo drive; and
   an electronic control unit configured to perform a method compensating for a delay in the feedback branch of the at least one servo drive, the method including:
   determining the delay; and
   arithmetically compensating for the delay by measuring spatial expansions of a corresponding metal conductor of at least one of the servo drive and the feedback branch,
   wherein the delay takes place due to formation of eddy currents.

* * * * *